(No Model.) 4 Sheets—Sheet 1.

R. PEDERSON.
CORN HARVESTER.

No. 494,023. Patented Mar. 21, 1893.

Fig. 1.

WITNESSES:
Chas. Nida.
C. Sedgwick

INVENTOR
R. Pederson
BY
Munn & Co
ATTORNEYS.

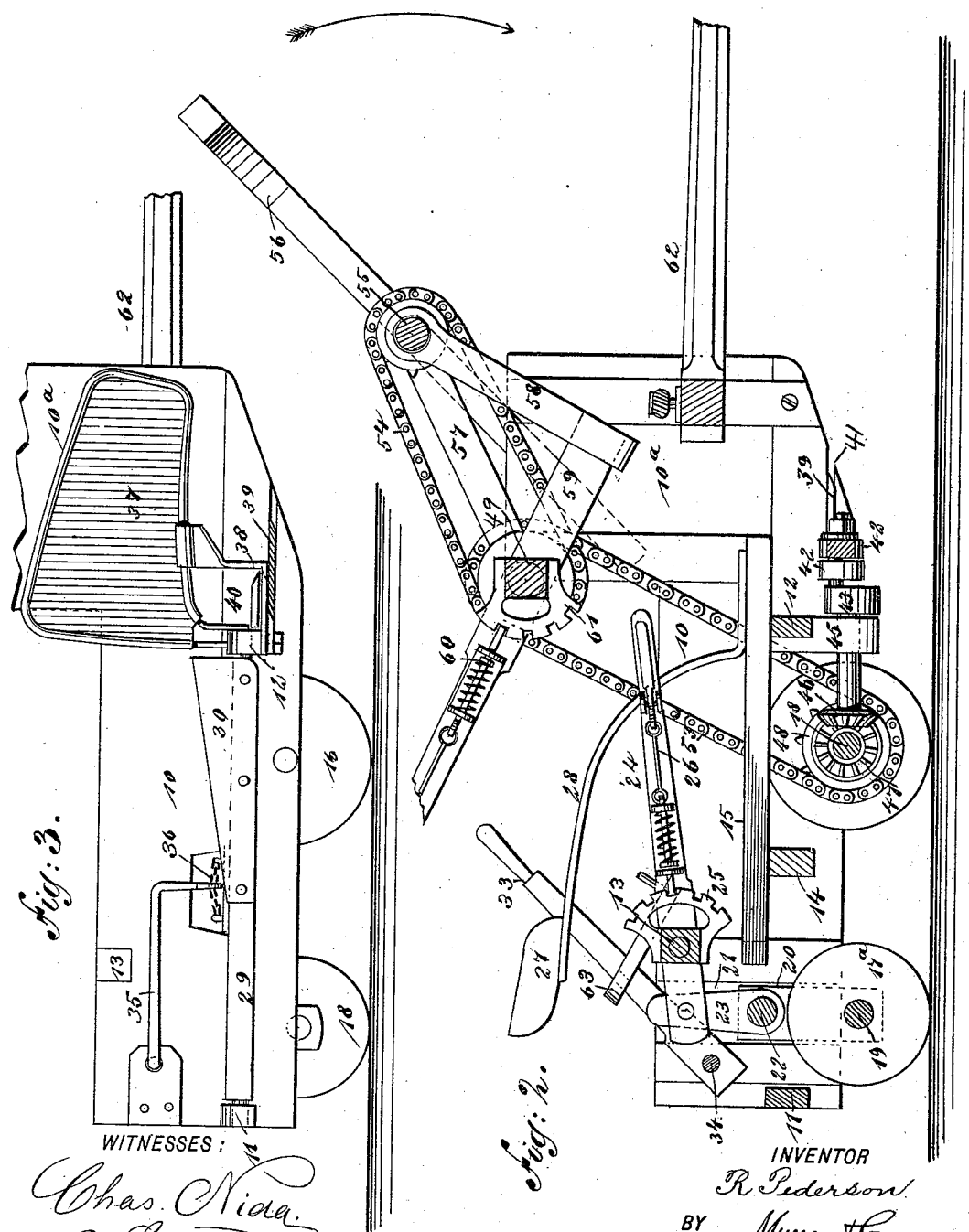

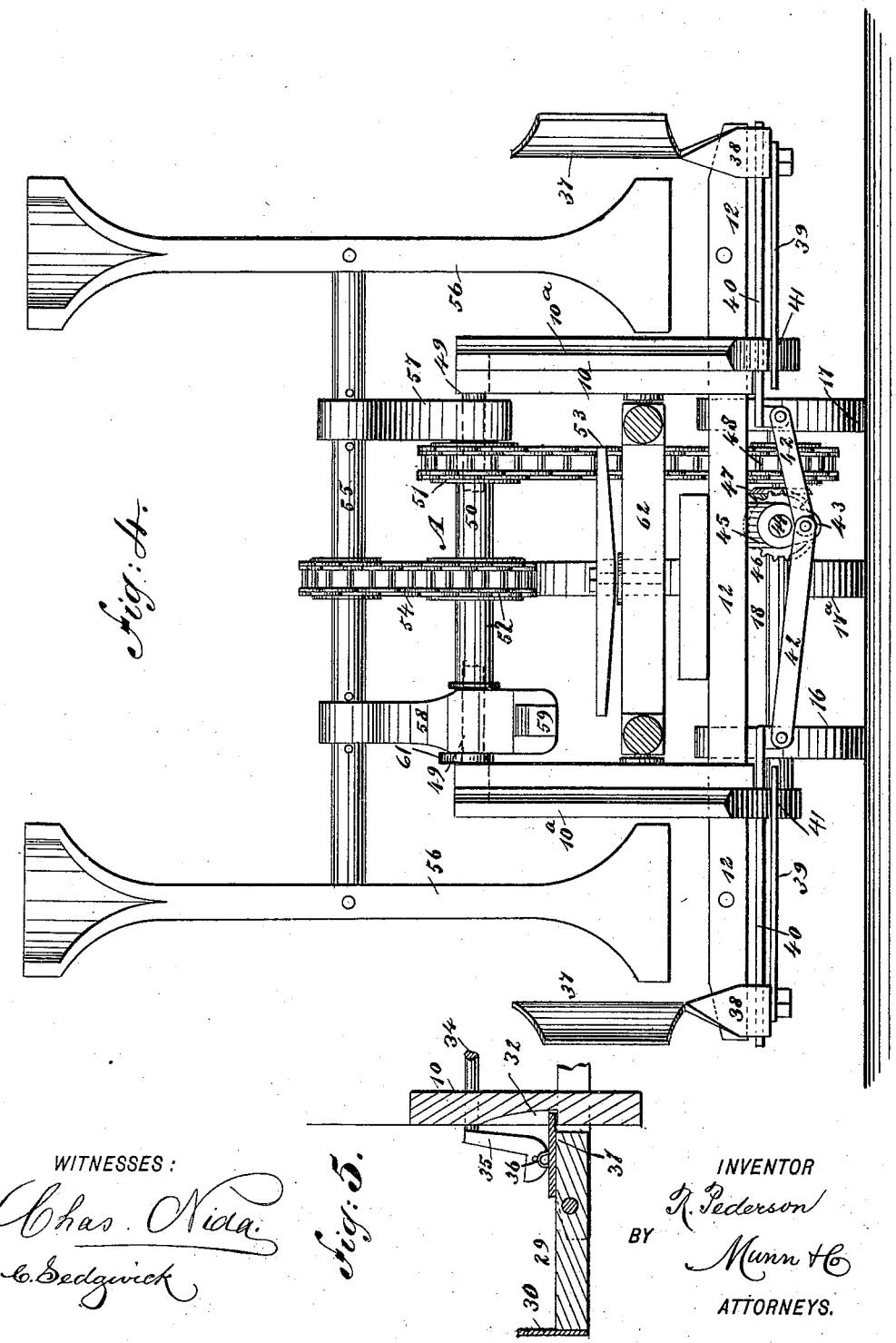

(No Model.) 4 Sheets—Sheet 4.
R. PEDERSON.
CORN HARVESTER.
No. 494,023. Patented Mar. 21, 1893.
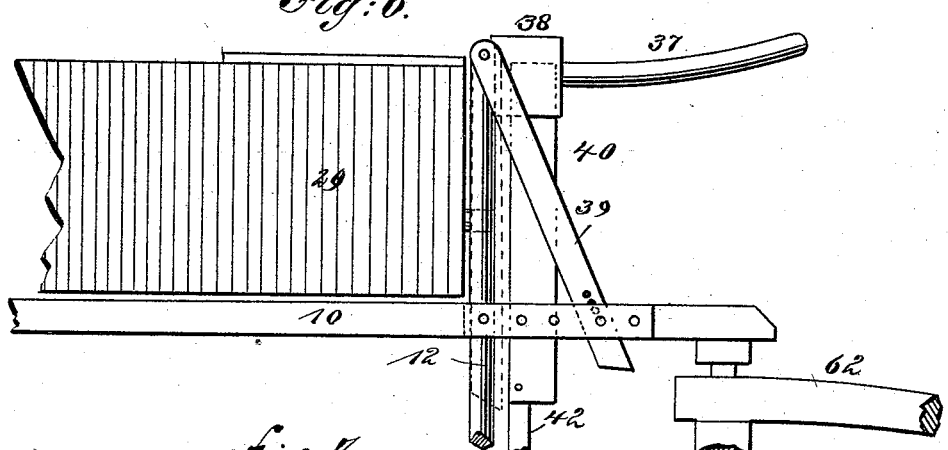
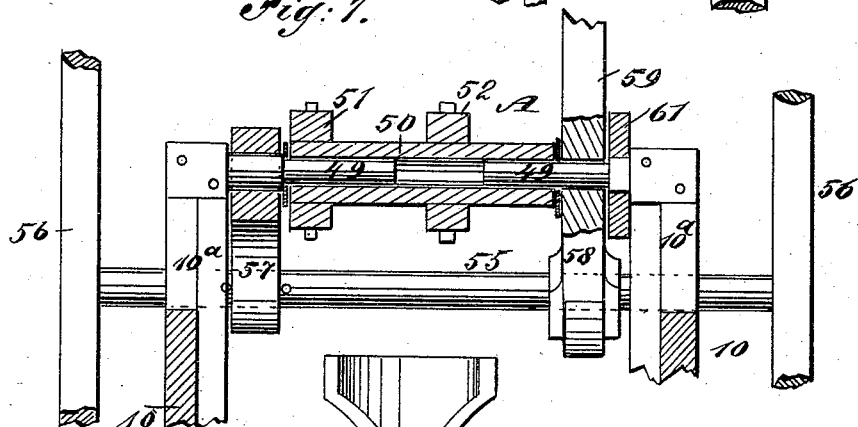
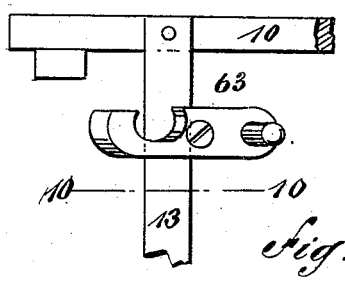
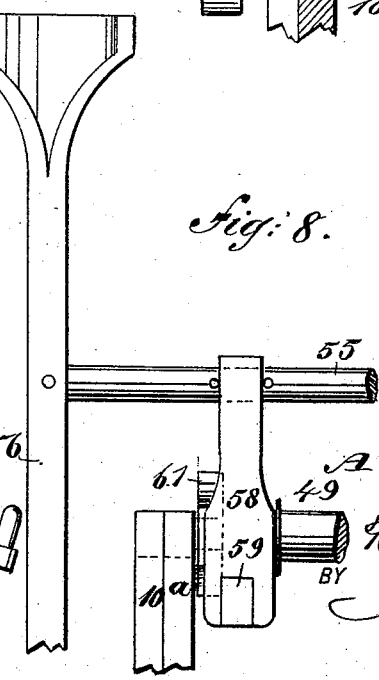
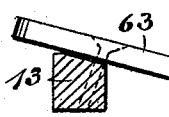
WITNESSES:
INVENTOR
R. Pederson
BY
Munn & Co
ATTORNEYS.

UNITED STATES PATENT OFFICE.

RASMUS PEDERSON, OF DRAMMAN, MINNESOTA.

CORN-HARVESTER.

SPECIFICATION forming part of Letters Patent No. 494,023, dated March 21, 1893.

Application filed April 11, 1892. Serial No. 428,658. (No model.)

*To all whom it may concern:*

Be it known that I, RASMUS PEDERSON, of Dramman township, in the county of Lincoln and State of Minnesota, have invented a new and useful Improvement in Corn-Harvesters, of which the following is a full, clear, and exact description.

My invention relates to an improvement in corn harvesters, and has for its object to provide an implement of this character of exceedingly simple and durable construction, and to so construct the implement that the cutters or knives employed may be either stationary or laterally reciprocated as may be desired.

Another object of the invention is to construct a corn harvester in such a manner as to provide for the proper feeding of the standing corn to the knives, and of the delivery of the harvested corn to tilting tables, through the medium of which tables, when suitable bundles have been formed, or proper quantities have been accumulated upon the tables, the said tables may be dropped or tilted to spill the harvested corn upon the ground.

Another object of the invention is to so construct the machine that it may be drawn between rows of corn and cut the stalks of the two rows at the same time.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1 is a plan view of the harvester. Fig. 2 is a longitudinal vertical section taken practically on the line 2—2 of Fig. 1. Fig. 3 is a side elevation of the harvester. Fig. 4 is a front elevation, the thills being in section; and Fig. 5 is a section through one of the tilting tables and a portion of the side of the implement at which the table is located. Fig. 6 is a bottom plan view of one side of the machine, illustrating the relation of the cutting knives to each other and the adjustability of one of them. Fig. 7 is a sectional view of the sectional shaft upon which the reel is mounted. Fig. 8 is a partial front elevation of the reel and the lever controlling it, together with the rack for the lever. Fig. 9 is a view of the catch controlling the dumping lever; and Fig. 10 is a section taken practically on the line 10—10 of Fig. 9.

The frame of the implement consists primarily of two side pieces 10, higher at their front than at any other portion of their length, the higher portion of the sides being designated as $10^a$, on the drawings, and the height of the portion $10^a$ of the side pieces is practically the height of standing corn; by this means the side pieces of the frame are rendered sufficiently high to prevent the corn from topping over into the mechanism, or leaning over toward said mechanism, while the rear portion of the side pieces can be made quite low and thus reduce the weight of the frame. The sides are connected at the back by means of a cross beam 11, which extends some distance beyond the outer faces of the side pieces, and a similar beam 12, connects the side pieces between their centers and their forward ends, and this latter cross beam also extends beyond the outer faces of the sides even for a greater distance than does the rear cross beam 11. The side pieces are also connected at the top near their rear ends by an upper cross bar 13, and by an intermediate cross bar 14, the latter cross bar being located between the top and bottom of the sides, as shown in Fig. 2.

Upon the cross bar 14 a platform 15, is secured in any suitable or approved manner, the said platform being likewise supported by the forward lower cross beam 12. The lower cross beams 11 and 12, are preferably made of metal, and may be shaped, if desired, as angle beams in cross section.

The body is supported and carried by three wheels, two forward wheels 16 and 17, which are secured in any suitable or approved manner upon the axle 18, the said axle being journaled in the side pieces of the frame near the center, and the peripheral surface of the wheels 16 and 17, is usually roughened so as to take firm hold upon the ground and prevent slipping: the third wheel $17^a$ is located upon the center of an axle 19 the said axle being near the rear end of the frame. The rear axle is vertically adjustable, as it is journaled in blocks 20, and these blocks are capable of moving vertically in slide-ways 21, produced upon the inner faces of the side pieces of the frame, the blocks 20, being connected near their upper ends by a fixed shaft 22, and this shaft carries an upwardly-extending link 23, which link is pivotally attached to the rear end of a lever 24, the latter being fulcrumed upon the upper cross bar 13 of the frame. This cross bar, adjacent to the lever, has rigidly secured thereto a rack 25, and this rack is adapted to be engaged by a thumb latch 26, forming a portion of the lever 24. By raising and lowering the axle 19, the rear of the implement may be raised or lowered, and thereby the forward portion depressed or elevated as may be demanded during the process of cutting, and the adjustment may be quickly effected through the medium of the lever 24. This lever is within convenient reach of the driver's seat 27, which is attached preferably to a spring standard 28, the latter being secured to the platform 15, as shown in Fig. 2.

Two tilting tables 29, are employed in connection with the implement, one being located at each side of the machine. These tables are fulcrumed by being provided with trunnions, which trunnions are journaled in the extensions of the front and rear lower cross beams 11 and 12. Each table at its outer forward edge is provided with an attached guard plate 30, the upper surface of which is preferably beveled downward in the direction of the rear; and each table is provided at or near its center at its inner edge with a stop plate 31, which plates are adapted to engage with the base walls of recesses 32, produced in the outer faces of the side pieces of the frame, this engagement occurring when the tables are in their receiving or horizontal position.

When it is desired to discharge the harvested corn from the tables they are tilted in such a manner as to spill the corn over their outer side edges back of the shield or guard plates 30. Both tables are simultaneously tilted by the manipulation of a lever 33, the said lever being attached to a crank shaft 34, journaled in the rear of the frame, the crank arms 35 of the shaft being located outside of the frame and extending forwardly and thence downwardly to an attachment with the tables immediately over the stop plates 31, and this connection is usually effected by passing chains 36, which have been secured at their ends to the stop plates, through openings in the lower end of the crank arms of the shaft. The corn is guided to the platforms or tables 29, as the implement advances, by upright shields 37, which are supported upon the outer extremities of the front cross beams 12; and these shields extend forwardly and at their forward ends are curved slightly outward, and the sides of the frame are provided with the front extensions 10ᵃ in order to facilitate the guidance of the falling stalks to the tables, as the extensions at the sides are immediately opposite the shields 37. A stirrup 38, is formed beneath each shield, the said stirrups being supported by attachment to the lower edges of the shields and likewise to the outer extremities of the cross beam 12, the stirrups being located necessarily in front of the latter.

It is designed that the implement shall be provided with a fixed knife and with a reciprocating knife, one not necessarily being used when the other is employed. The fixed knives are designated as 39 and the reciprocating or sliding knives as 40.

What has been termed the stationary knives 39, are diagonally located with respect to the front of the implement, and they are secured at one end by suitable bolts and nuts to the under faces of the stirrups 38, and at their opposite ends are passed through slots 41, formed in the lower front edges of the side pieces of the frame, at which point they are attached by means of bolts, or their equivalents, their attachment to the frame being adjustable, as shown in Fig. 6, the knives 39, being pivoted by bolts at their outer ends and held by bolts at their inner ends, may be removed when desired; but when the sliding or reciprocating knives only are to be used the inner ends of the fixed knives are carried rearward until the said fixed knives are back of the reciprocating knives, or practically so. It is evident that when the fixed knives are placed in this position they will not interfere with the action of the reciprocating knives throughout the length of the latter. The reciprocating knives 40, move freely at their outer ends in the stirrups 38; they move parallel with the outer face of the front cross beam 12; and the said reciprocating knives are attached at their inner ends to pitmen 42, which pitmen are pivotally connected with the crank 43, the said crank being located upon the forward end of a short longitudinal shaft 44, journaled in suitable bearings 45, projected downward from the platform 15, as shown in Figs. 2 and 4. The inner end of the shaft is provided with a beveled pinion 46 which meshes with beveled teeth 47, formed upon one side of a sprocket wheel 48, the latter being fast upon the forward axle 18 and turning with said axle. The pitmen may be disconnected from the crank 43 and the inclined stationary knives only be employed, or the latter knives may be removed or adjusted rearward and the reciprocating knives used, or if in practice it is found desirable both knives may be employed, in which event whatever stalks which may escape cutting by the diagonal fixed knives will be severed by the reciprocating knives.

While in some cases the reciprocating knives may be successfully employed by themselves, and in other cases the fixed diagonally-located knives only may be used, it is preferred that the two knives should act together, as when an inclined or diagonal knife is employed the corn stalks become jammed at the outer end of the diagonal knives to such an extent that said stalks are not cut, and a diagonally-located knife is more effective in cutting down corn stalks than a reciprocating knife which meets the stalks fairly in the front; but by placing a reciprocating knife over or under a diagonally located knife, so that as shown in the drawings the reciprocating knife will cross the diagonally-located knife only at the outer end, or that portion close to the dumping platform, the reciprocating knife will serve to cut effectively the stalks which may become jammed at the outer end of the diagonally located knife, while the remaining stalks, or those presented to the edge of the fixed diagonal knife will be quickly severed and with a shear cut. It will thus be observed that the two knives, when placed as shown in the drawings, insure the cutting of all of the stalks presented to them, and this feature of the case is an important one.

An upper drive shaft A, is employed in the construction of the machine, and this drive shaft is made preferably in three sections, two solid sections 49, which are fixed to the sides of the frame, the sections extending inward in such a manner that their inner ends practically abut, and a sleeve section 50, adapted to conceal the connection between the fixed sections of the shaft, and to turn freely upon said sections as shown in Fig. 7. The sleeve section is provided with two sprocket wheels 51 and 52, both of them keyed or otherwise secured to the sleeve, and the sprocket wheel 51, is connected by a chain belt 53 with the sprocket wheel 48 on the axle 18, as this axle is adapted for use as a drive shaft. The sprocket wheel 52, is connected by a chain belt 54, with a reel shaft 55, carrying at its ends reels 56, one reel being located opposite each space leading to the tables 29. The reel shaft is journaled in two arms, one arm 57 being loosely mounted upon a fixed section 49 of the upper drive shaft A, and the other arm 58, is connected with the lower end of a lever 59, extending forward at a right angle from the lever, and this lever is fulcrumed upon the other portion of the fixed section of the drive shaft, the lever 59, being provided with a hand latch 60, capable of engagement with a rack 61, which rack is firmly secured to a fixed section 49 of the upper drive shaft. Thus the reel may be raised or lowered by the manipulation of the lever 59, and held in any position desired by the hand latch of that lever engaging with the rack 61, and at the same time the reel will be driven, by reason of its belt connection with the sleeve section 50 of the upper drive shaft, which sleeve section is constantly revolved while the implement is in motion by reason of its connection with the forward axle 18. The reel is adjusted vertically by depressing or raising the lever 59, as said lever is rigidly connected through the medium of an arm 58 with the reel shaft near one end of the latter, and the lever is free to turn upon a fixed section of the sectional shaft A, while the opposite fixed section of the sectional shaft is pivotally connected with the reel shaft by an arm 57 about the same distance from the center as the arm 58. Thus the two arms 57 and 58, are located at equal distances from the center of the reel shaft, and although the lever 59, is located nearer to one end of the reel shaft than to the other end, the reel when elevated will remain as true as is required for all practical purposes, the distribution of the arms 57 and 58 preventing any appreciable sagging in the reel at either end.

In connection with the belt 54 any approved form of tension pulley may be employed.

The thills 62, are pivoted between the sides of the frame at the front, as the thills are adapted for a single horse only.

The rear lever 33, manipulating the crank shaft 34 and used for tilting the tables 29, is held in a position to maintain the tables horizontally by means of a keeper 63 pivoted preferably to the upper cross bar 13, as shown in Figs. 1 and 2.

The operation of this implement is exceedingly positive and effective. The construction of the implement is very simple, economic and durable, the levers are all within convenient reach of the driver's seat, and in operation when the implement is drawn forward between two rows of standing corn, the corn standing in each row will be simultaneously cut, and will be guided to the tables 29. The corn stalks are permitted to remain upon the tables until a sufficient bundle has been formed, and at that time, by manipulating the lever 33, the tables may be tilted in such a manner as to spill the bundles to the ground, and are immediately restored to their horizontal position to receive another load.

As heretofore stated, the front of the machine may be raised or lowered to cut the corn as close to, or as far from the ground as may be desired, by raising and lowering the rear axle through the medium of the lever 24; and the reel by the manipulation of the lever 59, may also be raised or lowered without interfering with or stopping its rotary movement, so as to strike the stalks at their centers, or wherever may be desired between the top and the bottom.

Having thus described my invention, I claim as new and desire to secure by Letters Patent—

1. In a corn harvester, a cutting device consisting of two knives, one located diagonally with respect to the sides of the machine and the other at a right angle to the sides, the diagonal knife being fixed and the knife located at right angles to the sides capable of reciprocating movement, the reciprocating knife crossing the diagonally-located knife at its outer end only, as and for the purpose specified.

2. In a corn harvester, the combination, with the body of the machine, the side portions at the front of the machine being of a height corresponding essentially to that of standing corn, and a shield located opposite the higher portions of the body, of dumping platforms arranged at the rear of the shields and opposite the spaces between the shields and the sides of the body of the machine, cutting devices located in front of each of the platforms, each of the said cutting devices consisting of a knife diagonally located with respect to the sides of the machine and the ends of the platforms, the outer end of the diagonal knives being carried in direction of the rear, and reciprocating knives traveling across the outer ends of the diagonally-located knives and parallel with the ends of the dumping platforms, a shaft journaled in the body and provided with crank arms at its ends, a connection between the crank arms of the shaft and the dumping platforms, and a shifting lever connected with the shaft, substantially as shown and described.

3. In a corn harvester, the combination, with the body thereof and tables located at the sides of the body, of knives located in front of the tables, one extending essentially parallel with and in front of the forward end of each table, the other knives being diagonally located in front of the forward end of each table across the knives, extending parallel with the tables near one end of said knives, a reciprocating mechanism connecting the knives extending parallel with the tables and operating said knives, and a means substantially as shown and described for adjusting the diagonally located knives, whereby any material that shall escape one knife will be cut by the other knife of the set, substantially as and for the purpose set forth.

RASMUS PEDERSON.

Witnesses:
J. P. ALEXANDER,
M. CORMELLY.